US012088983B2

(12) United States Patent
Prelogar et al.

(10) Patent No.: US 12,088,983 B2
(45) Date of Patent: Sep. 10, 2024

(54) IN-EAR WIRELESS AUDIO MONITOR SYSTEM WITH INTEGRATED INTERFACE FOR CONTROLLING DEVICES

(71) Applicants: Barrett Prelogar, Overland Park, KS (US); Patsy Prelogar, Overland Park, KS (US)

(72) Inventors: Barrett Prelogar, Overland Park, KS (US); Patsy Prelogar, Overland Park, KS (US)

( * ) Notice: Subject to any disclaimer, the term of this patent is extended or adjusted under 35 U.S.C. 154(b) by 431 days.

(21) Appl. No.: 17/379,649

(22) Filed: Jul. 19, 2021

(65) Prior Publication Data

US 2022/0021962 A1 Jan. 20, 2022

Related U.S. Application Data

(60) Provisional application No. 63/053,088, filed on Jul. 17, 2020.

(51) Int. Cl.
*H04R 1/10* (2006.01)
*H04S 7/00* (2006.01)

(52) U.S. Cl.
CPC ......... *H04R 1/1016* (2013.01); *H04R 1/1041* (2013.01); *H04S 7/30* (2013.01)

(58) Field of Classification Search
CPC .... H04R 1/1016; H04R 1/1041; H04R 1/028; H04S 7/30; G10H 1/0008; G10H 2220/201; G10H 2220/355; G10H 2220/395; G10H 2240/321; G10H 1/0066
See application file for complete search history.

(56) References Cited

U.S. PATENT DOCUMENTS

| | | | | |
|---|---|---|---|---|
| 10,672,239 | B2 * | 6/2020 | Loermann | H04M 1/05 |
| 2008/0146890 | A1 * | 6/2008 | LeBoeuf | A61B 7/003 600/300 |
| 2010/0217102 | A1 * | 8/2010 | LeBoeuf | A61B 5/7282 600/310 |
| 2015/0281826 | A1 * | 10/2015 | Huang | H04R 1/1008 381/74 |
| 2016/0353195 | A1 * | 12/2016 | Lott | H04R 1/1041 |
| 2017/0289145 | A1 * | 10/2017 | Boesen | H04R 1/1016 |
| 2019/0086066 | A1 * | 3/2019 | Boesen | F21V 23/045 |
| 2019/0122577 | A1 * | 4/2019 | Mora | G09B 5/06 |
| 2021/0030998 | A1 * | 2/2021 | Wong | A61B 5/0245 |
| 2021/0195308 | A1 * | 6/2021 | Solis | H01F 27/006 |
| 2022/0330890 | A1 * | 10/2022 | Wong | A61B 5/0205 |

* cited by examiner

*Primary Examiner* — Oyesola C Ojo
(74) *Attorney, Agent, or Firm* — AVEK IP, LLC; Mark C. Young

(57) ABSTRACT

An in-ear wireless audio monitor system with integrated interface for controlling devices includes an in-ear monitor device in communication with a communication module. The in-ear monitor device provides audio, tactile, and other information to a wearer, and transmits information from sensors located in or on the device to the communication module which effectuates control of external devices over a two-way MIDI link. Thus, a performer using the device may command control of an external lighting, audio, or other device by using head gestures, or other movements or sounds such as using their teeth or tongues.

16 Claims, 3 Drawing Sheets

IN-EAR WIRELESS AUDIO MONITOR SYSTEM WITH INTEGRATED INTERFACE FOR CONTROLLING DEVICES

CROSS-REFERENCE TO RELATED APPLICATIONS

This application claims the benefit of U.S. Provisional Patent Application No. 63/053,088, filed Jul. 17, 2020, the disclosure of which is hereby incorporated herein in its entirety by reference.

BACKGROUND

Musicians and other performing artists, such as radio and television announcers, newscasters, vloggers, video performers, and others often use in-ear monitors (IEM's) to more clearly hear themselves or others while performing on stage or on camera. Such devices are typically sealed, in-ear devices in communication via a wired or wireless link to a source that provides audio to the wearer. Other configurations and form factors of IEM's, such as unsealed in-ear, over-the-ear, and others are also used based primarily on a user's preference.

During live performances, many artists rely on off-stage technicians to monitor and control various inputs to the artist's in-ear monitor, and to control various outputs from the artist's microphone(s) and remote control and event triggering devices. For example, a performing guitarist may rely on off-stage technicians to control their in-ear monitor volume and may signal via an upward thumb gesture that their in-ear monitor volume should be increased so that they can better hear their instrument as they play.

Similarly, artists rely on other people and/or off-stage technicians to control various other equipment associated with their performance, such as audio processors, lighting controls, mixing equipment, recording or playback systems, peer-to-peer or multi-channel communications systems and other connected apparatus. The artist thus must rely on others to perform desired tasks either on their own, in which case a desired action may be missed and/or mis-timed, or by cue from the artist, which can disrupt the artist's concentration in playing or otherwise performing.

Continuing the guitarist example, a performing guitar player may employ numerous external effects through which the sound input from the guitar is connected. Different effects and various expression variables for the effects may be triggered and controlled either by back-stage technicians, or more commonly by the performer themself via a foot pedal style controller—which may also be slaved into a larger external rack of additional effects. Those additional effects may be further interfaced and connected via MIDI (musical instrument digital interface) or other similar protocol to other instruments, other musicians, recording equipment, sound amplification and PA equipment, lighting and stage special effects systems, and the like.

In this example scenario, the performing guitarist winds up physically tethered to a location on the stage where he or she has access to the pedal board or other controller in order to interface with the broader connected systems in order to effectuate a desired command. Furthermore, beyond the requirement to return to a specific stage location to manipulate the pedal board or other controller, the guitar player (or other performing artist) must direct his or her gaze and concentration to that pedal board or controller and away from the audience and away from his or her instrument, thus placing a severe ergonomic burden on the artist. Mishaps and missed or inadvertent commands are thus both frequent and frustrating, compromising the quality of the performance and invariably throwing the performer mentally off-kilter.

Thus, it can be seen that there remains a need in the art for a system that allows a performing artist to precisely and effortlessly control desired effects, lighting, audio processors, and the like without requiring that the artist be tethered to a particular area of the stage or to a particular location of control equipment, and that eliminates the need for an artist to avert his or her gaze or to physically manipulate or interact with the controller.

SUMMARY

A high-level overview of various aspects of exemplary embodiments is provided in this section to introduce a selection of concepts that are further described in the detailed description section below. This summary is not intended to identify key features or essential features of exemplary embodiments, nor is it intended to be used in isolation to determine the scope of the described subject matter. In brief, this disclosure describes an in-ear wireless audio monitor system with integrated interface for controlling devices that allows a performer to trigger various actions, such as audio, lighting, effect, or other actions, or to trigger macros or sequences of such actions, without requiring them to physically interact with a controller or other on-stage equipment or to otherwise interrupt or distract from their performance.

In one embodiment, the system of the present invention provides an in-ear control module operable to communicate with a communications module to provide audio, tactile, and other information to a wearer of the in-ear control module. The in-ear control module further provides an in-ear monitor device for insertion into the ear canal of a wearer that provides an audio signal from an external source to the wearer. The in-ear monitor device includes a battery to power the circuitry and sensors contained therein, a CPU, a wireless communications interface, a touch interface, one or more external microphones, an in-canal microphone, an in ear transducer, a digital signal processing (DSP) unit, a pulse code modulation (PCM) unit, and control circuitry providing an interface between all of the components The in-ear monitor further includes other sensors, such as accelerometers, GPS sensors, directional sensors, and others to detect a wearer's movements and or head gestures.

The in-ear monitor device is preferably shaped to fit within the ear cavity of a wearer with the touch interface and external microphones oriented externally of the ear cavity for easy access by the wearer, with the in-ear transducer and in-canal microphone positioned within a tube portion that extends into the wearer's ear canal. The tube includes a soft tip covering the end of the tube to protect the wearer's ear and to provide a snug fit within the ear canal.

A communication module is configured to communicate with the wireless communication interface of the in-ear monitor via WiFi, Bluetooth, NFC, NFMI, cellular, 5G, optical, or other communications protocol to allow the transfer of data to and from the in-ear monitor device. Similarly, the communication module is configured to communicate with one or more external devices, such as sound processing and effects units, lighting and other visual effects units, sound amplification and sound reinforcement units, other musical instruments, and the like. The communication module is preferably integrated into the in-ear device housing, and thus is in direct wired communication with the control circuitry of that device. In alternative embodiments, the communication module may be separate from the in-ear device, and may be configured as a wearable device such as a belt-clip device, or may be integrated into a mobile phone or watch device, in which case the communication module preferably communicates wirelessly with the in-ear device. Preferably, the communication between the communication module and the external devices is accomplished using an industry standard MIDI protocol or other audio or musical communications protocol. In alternative embodiments other communications protocols may be used.

With the in-ear monitor device and communication module, the system may capture input from the in-ear monitor device and effectuate a command to the communication module and further to an external device. For example, an accelerometer may capture a triple head nod by the performer, which the communication module translates to a "lights on" command, which is transmitted across the MIDI data stream, causing the lighting module to turn on the house lights.

The hands-free, wirelessly-enabled, nearly-invisible and physically untethered control thus allows a performance artist to directly and seamlessly control external devices without the myriad limitations imposed by traditional tethered interface devices, and without reliance upon backstage technicians. This further allows for spontaneous control by the performer without the constraints of predetermined scripts followed by off-stage technicians.

In further embodiments, the in-ear monitor device may include any desired combination of sensors, such as microphones, infrared, magnetic, capacitive, mechanical, motion and acceleration/deceleration, temperature, and the like with the internal CPU of the device running software and firmware to process inputs from these sensors in order to interpret various intents of the user.

Preferably, library of gestures, sensor inputs, etc. is defined corresponding to the various artist 'intents', forming a vocabulary of command and control options that can be implemented by the artist, for example, by head movements, clicking of the teeth, spoken commands, and combinations thereof. The commands to be executed may be either local commands—which act locally at the in-ear monitor, e.g., to turn up the volume of the in-ear monitor—or may be commands for external devices, such as rack-mount effects, recording equipment, telecommunications equipment, lighting and special effects, and even other digitally connected instruments as described above. The library of commands may further include macros, stacked, and/or sequential commands, wherein a single head gesture by the artist may instigate multiple simultaneous commands, such as to an external amplifier, lighting control, and in-ear volume, or may instigate a series of sequential commands, such as turning on lighting, then after a predetermined time, increasing the amplifier volume, etc.

The system of the present invention is not limited to use with musical instruments or by musicians. For example, dancers may use the system to capture their various singing and movement routines to trigger musical sounds or lighting events. A performer in another scenario might utilize movements of the head, for example, to serve as rhythmic drum control triggers, or might assign movements or other triggering events from the MIDI enabled in-ear monitor to correspond to various notes on a keyboard. Clicking one's teeth, or silently popping the tongue off of the roof of the performer's own mouth might trigger the engagement or disengagement of a backing track, or might serve to initiate or stop a recording, or start/stop a looper track. A musician nodding his or her head in rhythmic time might instigate calibration of B.P.M. (beats per minute) of a click-track used to keep other musicians perfectly in-time to the lead artist.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of embodiments thereof. Rather, the subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

The invention will be described herein with respect to several exemplary embodiments. It should be understood that these embodiments are exemplary, and not limiting, and that variations of these embodiments are within the scope of the present invention.

Figure 1:
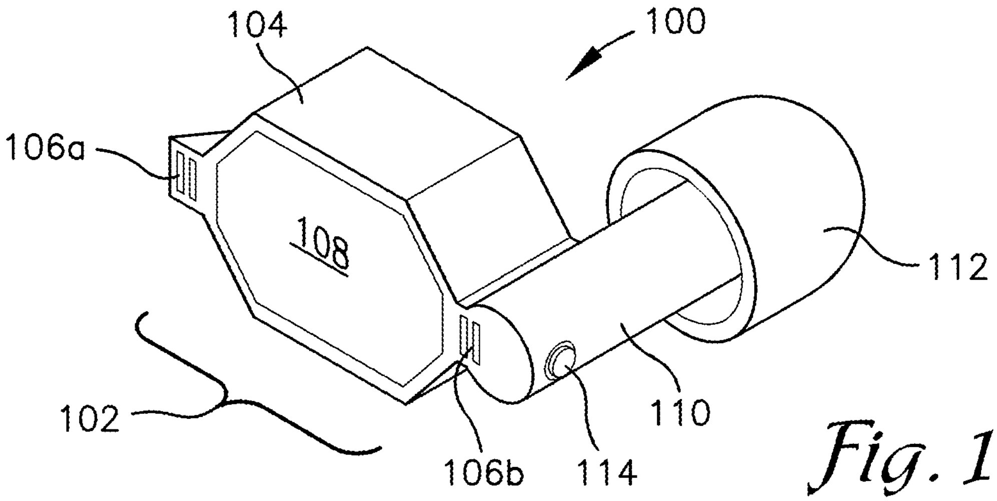
FIG. 1 is a perspective view of an in-ear wireless audio monitor with integrated interface for controlling devices in accordance with an exemplary embodiment of the present invention.

Looking first to FIG. 1, an in-ear monitor device in accordance with a first exemplary embodiment of the present invention is depicted generally by the numeral 100. The in-ear monitor device comprises a main body portion 102 comprising a housing 104 containing circuitry, sensors, and a battery as will be described in more detail hereinbelow. First and second external microphones **106*a*, 106*b* are positioned on opposite sides of the front side of the housing 104. A touch panel 108 on the front side of the housing 104 provides a touch pad or switch for manual control by a user. The touch panel 108** may be a switch, such as a push button switch, or may be a capacitive or other touch sensor capable of detecting a touch or presence of a finger of the user. In some embodiments, the touch panel comprises multiple switches, sensors or zones, with the multiple zones corresponding to distinct inputs which may control separate functions.

A cylindrical tube 110, configured for partial insertion into the ear canal of a user/wearer is attached to and extends rearwardly from the right side of the housing 104. A foam tip 112 is positioned over the end of the tube 110 to protect the ear canal of the wearer and to provide a snug fit within the canal. An LED 114 is positioned at the front end of the tube to provide visual indication of the status of the in-ear monitor, and/or to visually convey other information.

Figure 2:
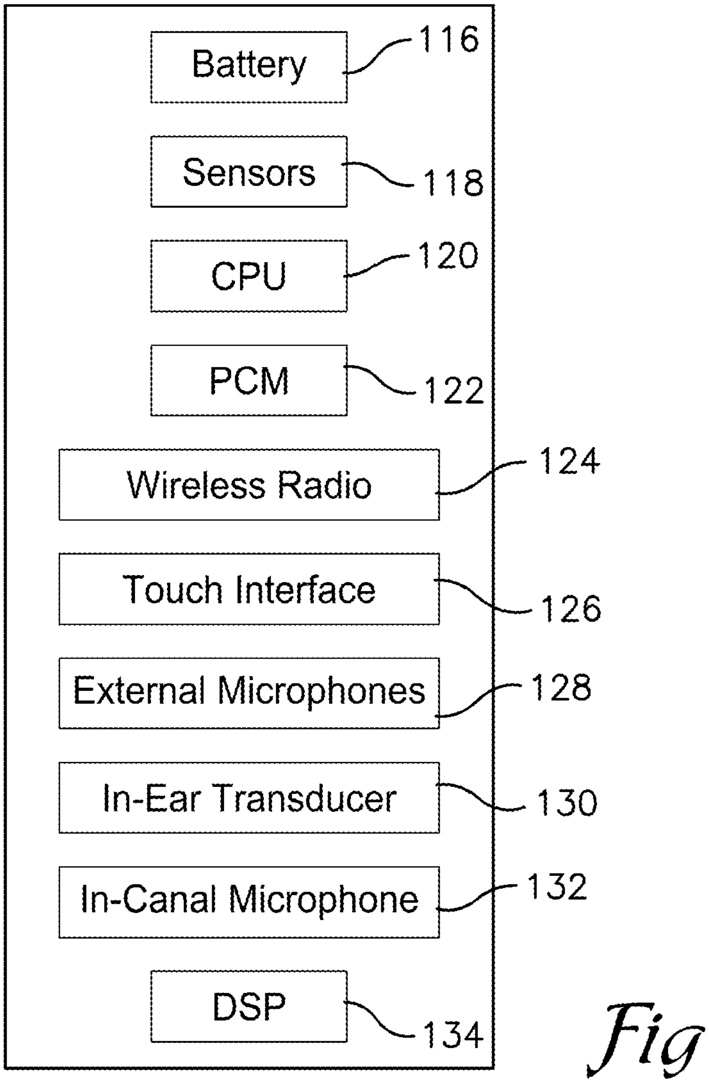
FIG. 2 is a general block diagram of the in-ear wireless audio monitor of FIG. 1 in accordance with an exemplary embodiment of the present invention.

In addition to the externally visible components of the in-ear monitor as just described, turning to FIG. 2, a block diagram of other circuitry and components located internally to the housing 104 is depicted. The internal components include a battery 116 for providing power to the circuitry, sensors, and components of the in-ear monitor. Sensors 118 include: motion sensors, such as accelerometers, operable to detect movement of the in-ear monitor such as movement of the wearer's head; radar sensors operable to detect movement and/or the presence of objects, such as a wearer waving or passing their hand in proximity to the in-ear monitor; touch sensors, such as touch panel 108, operable to detect touch by a wearer's fingers; temperature sensors, operable to detect the temperature of the wearer and/or the temperature of the air or objects in the vicinity of the wearer; infrared sensors operable to detect the presence of other people; and GPS sensors operable to detect a geographic location and position of the in-ear device. In alternative embodiments, other sensors such as directional sensors, altitude sensors, humidity sensors, and other sensors known in the art may be deployed on or within the in-ear monitor.

Looking still to FIG. 2, a central processing unit CPU 120 is operable to execute instructions such as applications (apps) and other programs to collect, analyze, store, and transmit data from the various other circuitry and sensors. It should be understood that the CPU 102 includes the necessary memory to store the instructions and data, with the memory internal to the CPU or external and contained in other circuitry. A pulse code modulation unit (PCM) 122 is operable to convert analog audio signals captured by any of the microphones of the in-ear monitor device to corresponding digital signals. A wireless radio interface 124 is operable to transmit and receive data and information to and from the in-ear monitor device. A touch interface 126 may include the front panel touch interface 108 as previously described, and may include additional touch sensors or switches, with the touch interface 126 operable to receive user touch input.

External microphones 128 may include the external microphones 106*a*, 106*b* as previously described, and may include additional external microphones, such as to implement noise cancellation or to provide additional audio detection capabilities. In-ear transducer 130 is operable to convert signals and information received by the in-ear monitor device to audible signals hearable by the wearer. In-ear transducer 130 will primarily and typically be used to convert a received digital audio signal to an analog signal for use by the wearer as a monitor—i.e., to hear themselves play or sing. In-canal microphone 132 is positioned within the cylindrical tube 110 and is operable to detect sounds and/or vibrations generated by the user when speaking, singing, clicking their teeth, or popping their tongue. As described above, these detected sounds may be translated to commands to instigate or effectuate commands to control various external devices.

A digital signal processor (DSP) 134 is operable to process and/or analyze digital signals, such as audio signals within the in-ear monitor to implement equalizations, detect specific frequencies or sounds, and the like.

Figure 3:
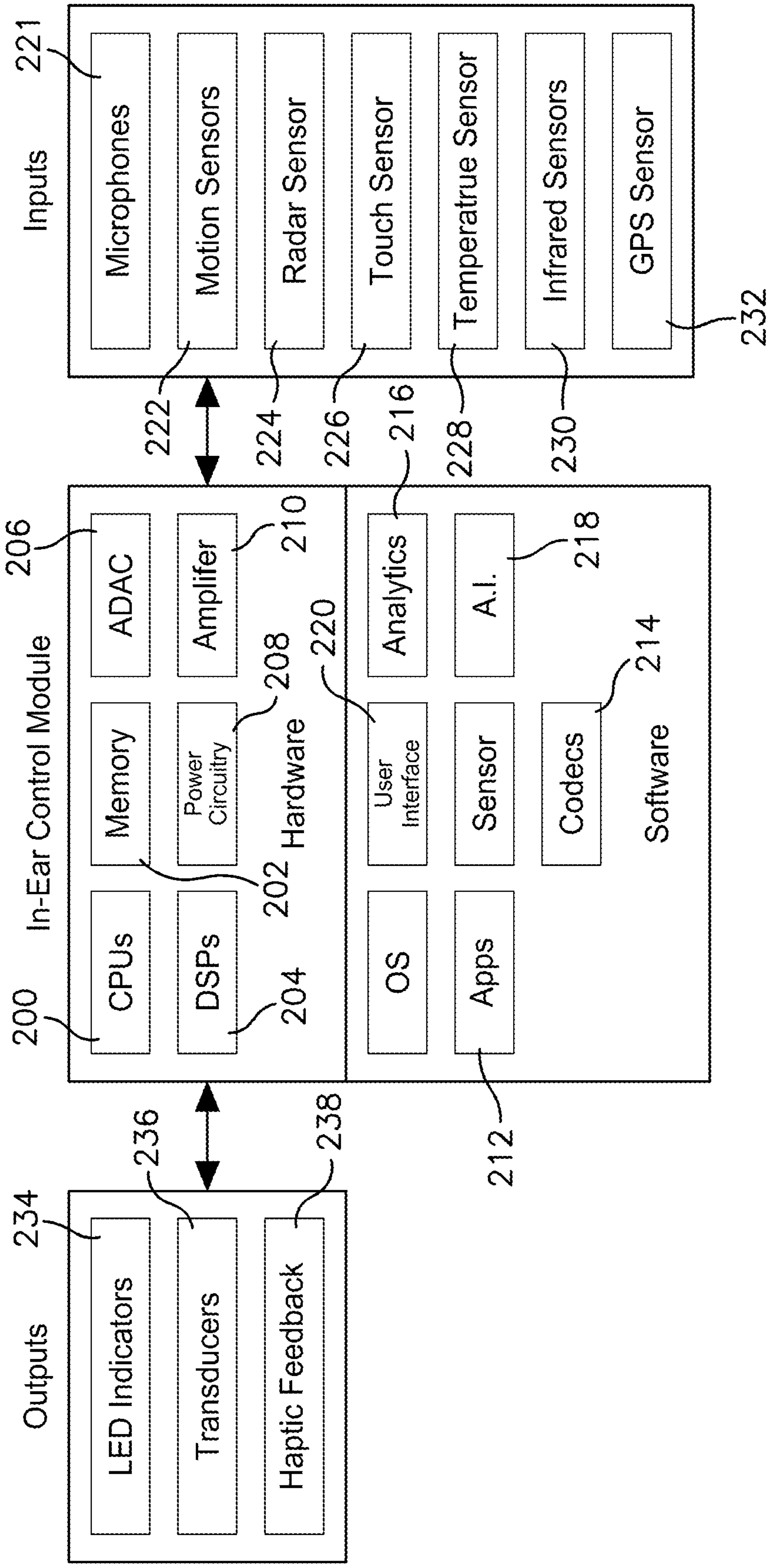
FIG. 3 is a detailed block diagram of the in-ear wireless audio monitor of FIGS. 1 and 2 in accordance with an exemplary embodiment of the present invention.

Turning to the detailed block diagram of FIG. 3, in further and alternative embodiments, the in-ear monitor device may include further and additional inputs, outputs, and processing capabilities. As seen in FIG. 3, the in-ear control module may include one or more CPUs 200 as previously described, memory 202, DSPs 204, and analog-to-digital and digital-to-analog converters 206. Power circuitry 208 may include a battery as previously described or may include a supercapacitor, as well as charging and power monitoring circuitry. Amplifier 210 is operable to amplify the analog audio signal provided to the in-ear transducer to provide an audible audio signal to the wearer.

As shown in FIG. 3, the CPUs 200 and circuitry are configured to execute various Apps 212 for performing various functions, Codecs 214 to encode and decode signals, Analytics 216 to analyze various signals and information, and artificial intelligence 218 to provide adaptive and learning algorithms—e.g., to learn and/or predict upcoming events—and/or to monitor various information and signals exchanged, received, and transmitted by the in-ear monitor.

A user interface (UI) 220 coordinates and implements the various sensors, inputs, and outputs to allow a user/wearer to control the device. For example, the UI may implement detection of a long-press of the touch sensor to instigate a power-off of the device, and may implement a quick double tap of the touch sensor to change modes of operation.

Looking still to FIG. 3, various sensor inputs such as microphones 221, motion sensors 222, radar sensors 224, touch sensors 226, temperature sensors 228, infrared sensors 230, and GPS sensors 232, all as described above, may be inputs to the in-ear monitor device. Outputs of the in-ear monitor may include LED indicators 234, such as LED 114 as previously described, transducers 236, such as the in-ear transducer 130 as previously described, and haptic feedback devices 238 to provide subtle haptic cues to the wearer.

Figure 4:
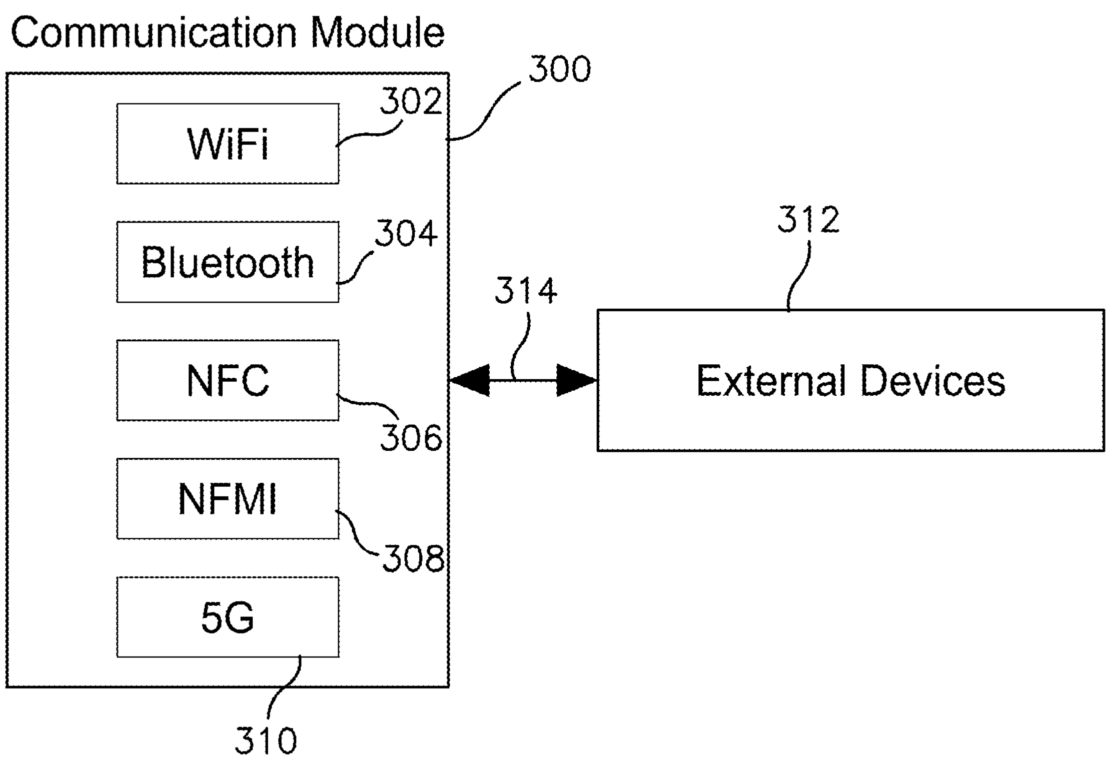
FIG. 4 is a detailed block diagram including a communication module for integral or distributed use with the in-ear wireless audio monitor and control module of FIGS. 1 through 3 in accordance with an exemplary embodiment of the present invention.

Looking to FIG. 4, communication module 300 is operable to communicate with the in-ear monitor device 100 either directly, in an embodiment where the communication module is integral with the in-ear monitor device 100, or over any one of, or combinations of, various wireless communications methods and protocols. In the embodiment of FIG. 4, the communication module 300 preferably may WiFi 302, Bluetooth 304, NFC 306, NFMI 308, and 5G communications capabilities. In one wireless or distributed embodiment of the system of the present invention, communication module 300 communicates with the in-ear monitor device 100 over a WiFi or Bluetooth connection, or a combination of those methods and protocols. In alternative embodiments, the communication module may include further communications methods, such as optical or other digital or analog transmitters and receivers.

In a preferred embodiment, communication module 300 is integrated in the housing of the in-ear monitor device and is in direct communication with the control circuitry of the device. In alternative embodiments, the communication module may be separate from the in-ear monitor device, and may be configured as a wearable device, such as in a belt-clip attachable housing. In further embodiments, the communication module 300 may be housed in mobile phone and/or may be implemented in a mobile phone or other portable electronics device, such as a smart watch.

As described previously, and as depicted in FIG. 4, the communication module 300 is configured to communicate with one or more external devices 312 such as sound processing and effects units, lighting and other visual effects units, sound amplification and sound reinforcement units, other musical instruments, and the like. Preferably, the communication link 314 between the communication module 300 and the external devices 312 is a two way link, accomplished using an industry standard MIDI protocol or other two-way audio or musical communications link protocol. In alternative embodiments other communications protocols may be used.

With the in-ear monitor device and communication module as set forth, the system of the present invention may capture input from any of the various sensors and inputs to the in-ear monitor device and effectuate a command to the integrated or wirelessly connected communication module and further to an external device over the MIDI link. For example, as previously described, an accelerometer in the in-ear monitor may capture a head nod by the performer, which the communication module translates to a "lights on" command, which is transmitted across the MIDI data stream, causing the lighting module to turn on the house lights.

Preferably, the in-ear monitor device, communication module, or both include one or more libraries of gestures, sensor inputs, etc. defining desired actions corresponding to various artist 'intents', essentially forming a vocabulary of command and control options that can be implemented by the artist, for example, by head movements, clicking of the teeth, spoken commands, and combinations thereof. It should be understood that the libraries of gestures, etc. may be located locally in the in-ear monitor device or may be located in the communication module regardless of whether the communication module is integrated with the in-ear monitor or implemented as a stand-alone device as previously described.

The commands to be executed may be either local commands—which act locally at the in-ear monitor, e.g., to turn up the volume of the in-ear monitor—or may be commands for external devices, effectuated through the communication link over the MIDI interface to various devices such as rack-mount effects, recording equipment, telecommunications equipment, lighting and special effects, and even other digitally connected instruments.

The libraries of commands may further include macros, stacked, and/or sequential commands, wherein a single head gesture by the artist may instigate multiple simultaneous commands, such as to an external amplifier, lighting control, and in-ear volume, or may instigate a series of sequential commands, such as turning on lighting, then after a predetermined time, increasing the amplifier volume, etc.

Thus, as described herein, it should be understood that the system of the present invention may be implanted as an integrated system, wherein the entirety of the system is contained in the housing of the wearable, in-ear monitor device, or may be configured as a distributed system, wherein the system is implemented in separate subunits—e.g., as separate in-ear monitor device and separate communication module. These and other variations and configurations are within the scope of the present invention And, as described previously, the system of the present invention is not limited to use with musical instruments or by musicians. For example, dancers may use the system to capture their various singing and movement routines to trigger musical sounds or lighting events. A performer in another scenario might utilize movements of the head, for example, to serve as rhythmic drum control triggers, or might assign movements or other triggering events from the MIDI enabled in-ear monitor to correspond to various notes on a keyboard. Clicking one's teeth, or silently popping the tongue off of the roof of the performer's own mouth might trigger the engagement or disengagement of a backing track, or might serve to initiate or stop a recording, or start/stop a looper track. A musician nodding his or her head in rhythmic time might instigate calibration of B.P.M. (beats per minute) of a click-track used to keep other musicians perfectly in-time to the lead artist.

In further implementations, an on-the-street news reporter using the system of the present invention may control a camera or cameras using head movements, or an in-studio announcer may instigate camera cuts or other desired actions without relying on off-camera personnel. These and other implementations are within the scope of the present invention.

Many different arrangements of the various components depicted, as well as components not shown, are possible without departing from the scope of the description provided herein. Embodiments of the technology have been described with the intent to be illustrative rather than restrictive. Alternative embodiments will become apparent to readers of this disclosure after and because of reading it. Alternative means of implementing the aforementioned can be completed without departing from the scope of exemplary embodiments. Identification of structures as being configured to perform a particular function in this disclosure is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of exemplary embodiments described herein.

The invention claimed is:

1. An in-ear wireless audio monitor system with integrated interface for controlling devices, comprising:

an in-ear monitor comprising a transducer for providing audible and/or tactile signals to a wearer;

a plurality of sensors for detecting movements of a wearer;

control circuitry comprising a battery, a central processing unit, and a wireless communications interface, wherein the control circuitry is operable to detect one or more signals generated by at least one of the plurality of sensors and in response generate a command to control external music, audio, video and other performance devices via MIDI and other communications protocols, and further operable to receive feedback from external music, audio, video, and other performance devices via MIDI and other communications protocols;

a communication module coupled to the control circuitry, wherein the communication module is operable to propagate commands to external equipment in MIDI and other communications protocols; and a housing configured to contain the transducer, the plurality of sensors, the control circuitry, and the communication module such that the entirety of the system is contained in a wearable in-ear device.

2. The system of claim 1, wherein the control circuitry, in response to the received feedback, commands a notification to the wearer via haptic, audible, or other wearer-perceptible means.

3. The system of claim 1, wherein the wireless communications interface is operable to transmit and receive over WiFi, Bluetooth, NFC, NFMI, cellular, 5G, and optical communications protocols, and combinations thereof.

4. The system of claim 1, wherein the sensors comprise microphones, infrared sensors, mechanical switches, motion sensors, acceleration/deceleration sensors; temperature, capacitive sensors, and combinations thereof.

5. The system of claim 1, wherein the communication module is configured to communicate wirelessly with external devices, audio amplification equipment, audio processing equipment, and combinations thereof.

6. The system of claim 1, wherein the communication module includes memory operable to store commands, libraries of commands, and macro commands comprised of multiple individual commands.

7. An in-ear wireless audio monitor system with integrated interface for controlling devices, comprising:

an in-ear monitor comprising a transducer for providing audible and/or tactile signals to a wearer;

a plurality of sensors for detecting movements of a wearer;

control circuitry comprising a battery, a central processing unit, and a wireless communications interface, operable to detect one or more signals generated by at least one of the plurality of sensors and in response generate a command to control an external device;

a communication module operably coupled with control circuitry, wherein the communication module is operable to communicate wirelessly with external equipment to propagate commands to the external equipment in MIDI and other communications protocol; and a housing configured to contain the plurality of sensors, the control circuitry, and the communication module such that the entirety of the system is contained in a wearable in-ear device.

8. The system of claim 7, wherein the wireless communications interface is operable to transmit and receive over WiFi, Bluetooth, NFC, NFMI, cellular, 5G, and optical communications protocols, and combinations thereof.

9. The system of claim 7, wherein the plurality of sensors comprises microphones, infrared sensors, mechanical switches, motion, acceleration/deceleration sensors; temperature, capacitive sensors, and combinations thereof.

10. The system of claim 7, wherein the communication module is configured to communicate with external devices, audio amplification equipment, audio processing equipment, and combinations thereof.

11. The system of claim 10, wherein the communication module includes memory operable to store commands, libraries of commands, and macro commands comprised of multiple individual commands.

12. An in-ear wireless audio monitor system with integrated interface for controlling devices, comprising:

a wearable in-ear monitor comprising a battery, central processing unit, and a wireless communications interface;

a plurality of sensors positioned on the in-ear monitor for detecting movements of a wearer;

a communication module operably coupled with, and housed integrally within the in-ear monitor, wherein the communication module is operable to communicate wirelessly with external equipment and to propagate commands to the external equipment using MIDI and other communications protocols.

13. The system of claim 12, wherein the wireless communications interface is operable to transmit and receive over Wifi, Bluetooth, NFC, NFMI, cellular, 5G, and optical communications protocols, and combinations thereof.

14. The system of claim 12, wherein the plurality of sensors comprises microphones, infrared sensors, mechanical switches, motion, acceleration/deceleration sensors, temperature sensors, capacitive sensors, and combinations thereof.

15. The system of claim 12, wherein the communication module is configured to communicate wirelessly with external devices, audio amplification equipment, audio processing equipment, and combinations thereof.

16. The system of claim 12, wherein the system includes memory operable to store commands, libraries of commands, and macro commands comprised of multiple individual commands.

* * * * *